United States Patent [19]
Vandermeer

[11] Patent Number: 6,000,457
[45] Date of Patent: Dec. 14, 1999

[54] INVESTMENT CASTING MOLD AND METHOD OF MANUFACTURE

[75] Inventor: John Vandermeer, Bear, Del.

[73] Assignee: Buntrock Industries, Inc., Williamsburg, Va.

[21] Appl. No.: 09/105,782

[22] Filed: Jun. 26, 1998

[51] Int. Cl.$^6$ ....................................................... B22C 1/18
[52] U.S. Cl. .......................................... 164/518; 164/361
[58] Field of Search ..................................... 164/518, 361, 164/34, 35, 36; 106/38.22, 38.27, 38.3, 38.35, 38.9

[56] References Cited

FOREIGN PATENT DOCUMENTS 207864   1/1987   European Pat. Off. ................ 164/518

*Primary Examiner*—Kuang Y. Lin
*Attorney, Agent, or Firm*—Law Offices of John A. Parrish

[57] ABSTRACT

A process for rapidly forming a ceramic shell mold on an expendable pattern is disclosed. The process entails use of refractory slurries which include a large particle size colloidal silica sol binder. The colloidal silica sol binder has an average particle size of about 40 nanometers, i.e., about 3–4 times larger than colloidal silica sol binders heretofore employed in manufacture of ceramic shell molds. The use of the large particle sols yields unfired ceramic shell molds which have about 40% to about 70% greater unfired strengths compared to ceramic shells made with prior art small particle size silica sols. Prime coats and refractory back-up coats which use the large particle size sol dry about 30% to about 40% faster than prime coats and back up coats which employ the smaller particle size silica sols of the prior art.

17 Claims, 1 Drawing Sheet

INVESTMENT CASTING MOLD AND METHOD OF MANUFACTURE

FIELD OF THE INVENTION

This invention relates to improved methods and compositions for investment casting technology.

BACKGROUND OF THE INVENTION

Investment casting by the lost wax process can be traced to ancient Egypt and China. The process as practiced today, however, is a relatively new technology dating to the 1930's and represents a rapidly growing business and science. Investment casting technology simplifies production of complex metal shapes by casting molten metal into expendable ceramic shell molds formed around disposable wax patterns which duplicate the desired metal shape. "Precision Investment Casting", i.e., PIC, is the term in the art that refers to this technology.

The conventional PIC process employs six major steps:
(1) Pattern Preparation

A disposable positive pattern of the desired metal casting is made from a thermoplastic material such as wax that will melt, vaporize or burn completely so as not to leave contaminating residues in the de-waxed ceramic shell mold. The positive pattern is prepared by injecting the thermoplastic material into a negative, segmented, metal die or "tool" designed to produce patterns of the shape, dimension and surface finish required for the metal casting. Single or multiple patterns can be assembled by fusing them to a disposable wax "sprue system" that feeds molten metal to fill the shell mold;

(2) Shell Mold Construction by
   (a) dipping the pattern assembly into a refractory slurry having fine particulate refractory grain in an aqueous solution of alkali stabilized colloidal silica binder to define a coating of refractory material on the pattern;
   (b) contacting the refractory coating with coarse dry particulate refractory grain or "stucco" to define a stucco coating, and
   (c) air drying to define a "green" air dried insoluble bonded coating. These process steps can be repeated to build by successive coats a "green", air dried shell mold of the desired thickness.

(3) Dewaxing

The disposable wax pattern is removed from the "green" air dried shell mold by steam autoclaving, plunging the green shell mold into a flash de-waxing furnace heated to 1000° F.–1900° F., or by any other method which rapidly heats and liquefies the wax so that excessive pressure build-up does not crack the shell mold.

(4) Furnacing

The de-waxed shell mold is heated at about 1600° F.–2000° F. to remove volatile residues and form stable ceramic bonds in the shell mold.

(5) Pouring

The heated shell mold is recovered from the furnace and positioned to receive molten metal. The metal may be melted by gas, indirect arc, or induction heating. The molten metal may be cast in air or in a vacuum chamber. The molten metal may be poured statically or centrifugally, and from a ladle or a direct melting crucible. The molten metal is cooled to produce a solidified metal casting in the mold.

(6) Casting Recovery

The shell molds having solidified metal castings therein are broken apart and the metal castings are separated from the ceramic shell material. The castings can be separated from the sprue system by sawing or cutting with abrasive disks. The castings can be cleaned by tumbling, shot or grit blasting.

Binders used in the refractory slurries affect the shell building process and ultimate shell mold quality. Binders should be chemically stable to ensure long service from a refractory slurry used for repetitive dip coats. Binders also should form insoluble bonds with the refractory grains during air drying to permit redipping of the pattern as well as to permit removal of the pattern during furnacing. The stabilized ceramic bonds produced in the shell during furnacing mold must also have adequate fired strength and refractoriness so as to withstand casting of molten metal.

Standard refractory slurry binders which have been employed in manufacture of ceramic shell molds include hydrolyzed ethyl silicates and small particle size sodium stabilized colloidal silicas having an average particle size of about 8–14 nanometer. The latter includes alkaline aqueous dispersions of colloidal silica stabilized with sodium hydroxide which are non-flammable and have low toxicity. The former is acid stabilized with sulfuric or hydrochloric acid added during hydrolysis to form colloidal silica in situ. The former, however, employs flammable, toxic alcohol solutions to maintain solubility. The ethyl silicate binders, however, permit faster drying and use lower levels of flux promoting sodium oxide.

In the conventional process for making ceramic shell molds, the interval required for drying between coats may vary from 30 minutes for refractory prime coats to 8 hours or more for back-up coats depending on mold complexity and shell wall thickness. Completed shell molds are usually air dried an additional 24 hours or more to assure adequate green strength for pattern removal. This dependence on air drying for shell mold quality accounts for a major portion of production time, contributes to high production costs and is a serious shortcoming.

Because of this shortcoming, numerous efforts have been made to shorten or eliminate the time interval required for drying between coats by using chemical methods to rapidly set the refractory slurry binder. These chemical methods have broadened the choice of refractory slurry binder candidates beyond hydrolyzed ethyl silicate and sodium stabilized colloidal silica to include ionic alkali metal silicates, and acid stable alumina modified colloidal silica. These prior art chemical methods include:

(1) Use of a Gaseous Gelling Agent to Gel Set a Slurry Binder System

U.S. Pat. No. 2,829,060 teaches the use of carbon dioxide to gel set an ammonia modified sodium silicate slurry binder system.

W. Jones, in a technical paper presented to the Investment Casting Institute in October of 1979, disclosed the use of carbon dioxide or acidic alumina solutions to set alkaline silicate binder slurries. Alkaline silicate binder slurries, however, can cause undesirable fluxing at high temperatures.

U.S. Pat. No. 3,455,368 teaches the use of ammonia gas to gel set a hydrolyzed ethyl silicate or acidified colloidal silica binder system. Ammonia gas, however, is toxic.

U.S. Pat. No. 3,396,775 teaches the use of volatile organic gases to gel set a hydrolyzed ethyl silicate slurry binder system. Volatile organic gases, however, present a ventilation problem that contributes to poor acceptance in the foundry.

(2) Use of Two Interacting Slurry Binder Systems to Gel Set One Another When Applied as Alternating Coats U.S. Pat. No. 2,806,270 teaches the use of:

1) nitric acid acidified sodium silicate slurry to gel set an alkaline sodium silicate slurry,
2) a phosphoric acid acidified potassium silicate slurry system to gel set any of:
   (a) an alkaline potassium silicate slurry,
   (b) an alkaline piperidine modified ethyl silicate slurry, and
   (c) an alkaline mono-ethanolamine modified ethyl silicate slurry system;
3) an acidic ethyl silicate slurry to gel set any of:
   (a) an alkaline potassium silicate slurry,
   (b) an alkaline piperidine modified ethyl silicate slurry, and
   (c) an alkaline mono-ethanolamine modified ethyl silicate binder system.

U.S. Pat. No. 3,751,276 and U.S. Pat. No. 3,878,034 teach the use of an acid stable alumina modified colloidal silica slurry binder system to gel set either an alkali stable ionic silicate binder slurry system or an alkali stabilized colloidal silica binder slurry system. The use of two interacting slurry binder systems, however, requires a change in conventional shell making procedure.

(3) Use of a Chemically Treated Stucco Grain to Gel Set a Binder Slurry System

Dootz, Craig and Payton in Journal Prosthetic Dentistry Vol. 17, No. 5, pages 464–471, May 1967 describe the use of monoammonium phosphate and magnesium oxide treated stucco to gel a sodium silicate binder slurry system. This approach, however, suffers the disadvantage that its effectiveness degrades over time and can contaminate the refractory binder slurry.

(4) Use of a Gelling Agent Solution to Gel Set a Binder Slurry System

U.S. Pat. No. 3,748,157 teaches the use of a basic aluminum salt setting agent solution to gel set
1) a sodium stabilized negative sol colloidal silica binder slurry, and
2) an alkaline ionic silicate slurry binder system.

Although these methods of the art have varying degrees of usefulness in preparing ceramic shell molds for use in PIC, they nevertheless require multiple catalyzation steps or substantial time intervals between successive coatings of refractory slurry materials. A need therefore exists for materials and methods which rapidly form ceramic shell molds.

SUMMARY OF THE INVENTION

The invention relates to a process for rapidly forming a ceramic shell mold on a disposable support member, and to the ceramic shell molds obtained thereby. The process employs a large particle size colloidal silica sol that has an average particle size of about 40 nanometer, a wide particle size range of about 6 nm to about 190 nm, and a standard deviation of about 20 nm. The large particle size sol which preferably is employed is available under the tradename Megasol™ from Wesbond Corp., Wilmington, Del. Megasol™ has an average particle size of about 40 nanometer, a particle size range of about 6 nm to about 190 nm, a standard deviation of particle sizes of about 20 nm, and a sodium content of about 0.22% vs. sodium contents of about 0.4 to 0.6% of prior art colloidal silica sols.

The process of the invention offers a number of advantages for the manufacture of ceramic shell molds over the above described prior art processes. For example, use of aqueous Megasol™ colloidal silica sol enables manufacture of green ceramic shell molds which have about 40% to about 70% greater unfired strengths compared to green ceramic shells made with prior art silica sols which have much smaller ranges of particle sizes.

Another advantage of the invention is that refractory slurry compositions which employ Megasol™ can accommodate a wide range of shell mold thermal-expansions. A further advantage is that refractory slurry compositions which employ Megasol™ have a colloidal silica solids content of about 40% to about 50% in the refractory slurry. These solids contents are much greater than the colloidal silica solids contents of about 22% to about 27% achieved in the refractory slurries which use conventional, small particle size silica sol binders. The higher colloidal silica solids content in refractory slurries which employ Megasol™ a advantageously enables more rapid drying of both refractory prime coats and refractory back-up coats.

Use of Megasol™ in at least one of the refractory prime coat slurries and refractory back-up coat slurries, preferably both slurries, yields increased stability of the slurries as well as higher strength ceramic shell molds. The invention advantageously eliminates the common industry practice of using a polymer in refractory slurries or using a polymer enhanced binder in refractory slurries. Elimination of polymers advantageously overcomes the prior art problem of manufacture of ceramic shell molds which have low fired modulus of rupture due to porosity generated when the polymer is burned out during furnacing. Elimination of polymers also overcomes the prior art problem of destabilization of refractory slurries over time as well as problems associated with quality control of the refractory slurries.

Prime coats and back-up coats which employ Megasol™ also dry about 30% to 40% faster than prime coats and back up coats which employ the smaller particle size colloidal silica sols of the prior art. This enables shorter drying times which reduces the cost of manufacture of the shells.

DETAILED DESCRIPTION OF THE INVENTION

Refractory Grains

Figure 1:
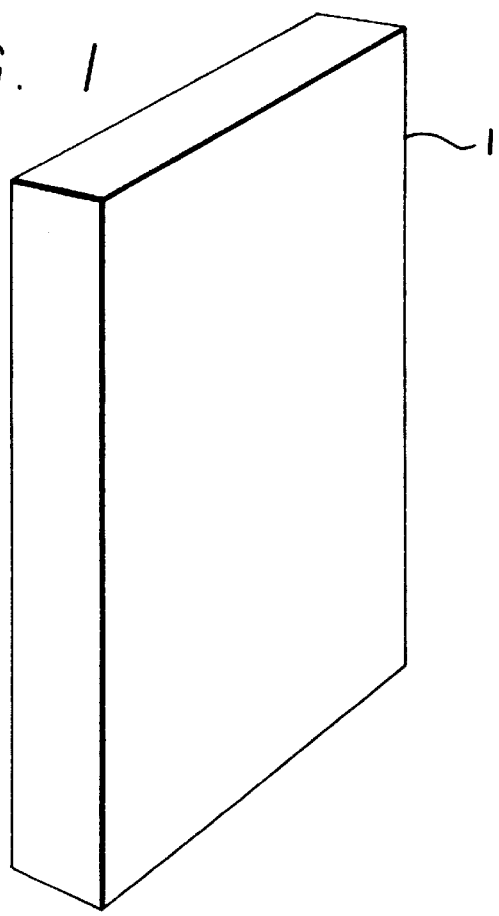
FIG. 1 illustrates a positive disposable pattern 1 of a desired metal casting.

A wide variety of refractory grains may be used with Megasol™ in refractory prime coat slurries as well as in refractory back-up coat slurries. Examples of these refractory grains include but are not limited to mullite, calcined china clay and other alumina silicates, vitreous and crystalline silica, alumina, zircon and chromite. The refractory grains preferably are free of ionic contaminates in amounts that can contribute to instability of the refractory grains and to thermally induced phase changes which can occur during metal casting. As is known in the art, refractory grains which are free from contaminates in amounts that can contribute to instability of the refractory grains can be produced by purification with or without calcining.

Preparation of Refractory Slurries

Refractory prime coat slurries and refractory back-up coat slurries utilize large particle size silica sol binders such Megasol™ with refractory grain in amounts sufficient to have a desired viscosity for use in the shell dipping process. Preferably, Megasol™ having a specific surface area of about 68 $m^2/gm$, an average particle size of about 40 nanometer, a particle size range of about 6 nm to about 190 nm, a standard deviation of particle sizes of about 20 nm, and a sodium content of about 0.22% is employed. The average particle size of Megasol™ is calculated by dividing the number 2727 by the specific surface area. The amounts of Megasol™ and refractory grain in the refractory slurry compositions can be varied over a wide range.

Megasol™ silica sol binder has a much larger particle size range and lower specific surface area than prior art colloidal silica sol binders. Megasol™ silica sol binder may be used at a pH of about 8.0 to about 10.0, preferably at a pH of about 9.0 to about 9.5. Megasol™ silica sol binder may be used at titratable $Na_2O$ contents of about 0.02% to about 0.35%, preferably about 0.1% to about 0.25%. Most preferably, Megasol™ silica sol binder is used at a titratable $Na_2O$ content of about 0.20% to about 0.22%.

Megasol™ silica sol binders for use in the invention may have varying solids contents. For example, Megasol™ may be used at a solids content of about 30% to about 50% solids content, preferably about 40 to about 47% solids content. More preferably, Megasol™ is used at about 45% solids content in at least one of the refractory prime coat slurries and refractory back-up coat slurries, most preferably in both slurries.

Refractory prime coat slurries and refractory back-up coat slurries are prepared by placing Megasol™ silica sol binder into a clean, water rinsed mixing tank and adding refractory material while mixing. Various mixing devices known in the art may be employed in the mixing tank. These devices include, for example, propeller type mixers, jar mills, high speed dispersion mixers, and turntable fixed blade mixers.

Refractory material is added while mixing until a desired viscosity is reached. For refractory prime coat slurries, this viscosity is typically about 18–30 seconds No. 4 Zahn, preferably 20–30 sec, most preferably 24–30 sec. Suitable viscosities for refractory back-up coat slurries which employ Megasol™ and fused silica refractory grain are about 10–18 sec. viscosity Zahn #4, preferably about 10–16 sec Zahn #4, most preferably about 12–15 sec Zahn #4. After additional mixing to remove entrapped air and to reach equilibrium, a final viscosity adjustment is made by adding additional Megasol™ colloidal silica sol binder or refractory material. Non-ionic surfactant and anionic surfactants also can be added to the refractory slurries.

Shell Mold Construction

Shell mold construction begins with the application of one to three coatings of a refractory prime coat slurry that includes refractory grains and Megasol™ to a clean, disposable pattern, preferably a wax pattern. The wax pattern preferably is formed from any filled or unfilled paraffin based investment casting grade wax, or microcrystalline wax. The wax pattern is dipped into the refractory prime coat slurry to coat the surface of the pattern with a continuous layer of refractory prime coat slurry, drained thoroughly to remove excess slurry, and then stuccoed with prime coat refractory stucco. The resulting prime coat(s) can have a thickness of 0.02" to 0.2", preferably 0.04" to 0.2", most preferably 0.04" to 0.1".

Different refractory slurry compositions may be used in the refractory prime coat slurries and refractory back-up coat slurries. The specific refractory prime coat slurries and refractory back-up coat slurries are determined by the ceramic shell mold characteristics desired to produce a metal casting having desired dimensions and surface finish from the disposable pattern.

The refractory prime coat slurry employs the finest sizes of refractory grain, usually about −200 mesh and finer, down to about −325 mesh. Refractory prime coat slurries which may be employed include Megasol™ together with a blend of −200 mesh fused silica and −325 mesh zircon flour. The zircon flour provides high resistance to molten metal. The fine particle size of the zircon flour also enables production of castings which have smooth, detailed surface finishes. Each prime coat is stuccoed with a coarse refractory grain, typically zircon sand of about −20 to about 200 mesh, preferably −70 to 140 mesh.

In refractory prime coat slurries which employ Megasol™, fused silica and zircon, the fused silica most preferably has a particle size of about −120 to about −200 mesh, and the zircon most preferably has a particle size of about −325 mesh. Fused silica sizes of about −100 mesh, about −120 mesh, about −140 mesh, about −170 mesh, about −270 mesh and about −325 mesh also may be used. Particle sizes of the zircon may be, for example, about −200 mesh, about −325 mesh and about −400 mesh. Preferably, the Zircon is about −200 mesh. Non-ionic surfactants optionally may be added to the refractory prime coat slurry. A particularly useful non-ionic surfactant which may be employed is PS9400 available from Buntrock Industries, Williamsburg, Va. This surfactant can be added to the refractory prime coat refractory slurry in an amount of up to about 0.2% based on the weight of the Megasol™ binder. This surfactant improves the ability of the refractory prime coat refractory slurry to wet the wax pattern and also assists in drainage.

Refractory back-tip slurries are applied to the stuccoed, prime coats to produce back-up coats. Refractory back-up slurries employ coarser refractory grain sizes than are used in refractory prime coat slurries. In refractory back-up slurries where fused silica is employed with Megasol™, the fused silica may have a particle size of about −80 mesh to about −270 mesh, preferably about −100 mesh to about −200 mesh. Most preferably, the fused silica is about −100 mesh to about −120 mesh. Each back-up coat is stuccoed with a coarse refractory grain to build thickness in the shell for added strength. The refractory grains which may be used as stucco on the back-up coats may vary from about −10 mesh to about 50 mesh, preferably about −20 mesh to about 50 mesh. Most preferably, these refractory grains have a size of about −30 mesh to about 50 mesh.

Back-up coats are applied over the stuccoed prime coats until the shell reaches a desired thickness and strength. The number of back-up coats applied depends on the size and weight of the metal casting to be formed in the ceramic shell. A thickness of ceramic shell of about 0.20 inch to 0.5 inch is sufficient for most castings. Two prime coats, and 4 to 5 back-up coats typically yield a 0.25 inch thick green shell that has a strength sufficient to withstand dewaxing and furnacing.

In an alternative embodiment, a transitional stucco refractory material, preferably zircon or an alumino silicate which has a grain size intermediate between the fine grained prime coat stucco and the coarse back-up coat stucco, may be applied to the prime coat-stuccoed expendable pattern prior to application of the coating of refractory back-up slurry. The transitional stucco coat can be used to add strength to the green shell and to minimize the possibility of delamination between the final coating of prime coat slurry and the first coating of refractory back-up slurry.

The green shell is dried at about 60° F. to about 90° F., preferably about 70° F. to about 75° F. Drying may be performed under accelerated conditions of low humidity and high temperature with rapid air movement.

The drying time between successive prime coats and back-up coats depends on the complexity of the shape of the expendable pattern. Expendable patterns which have deep cavities where airflow is minimal take longer to dry between coats. Simple patterns which have flat sides dry faster. Prime coats and back-up coats formed from refractory slurries which employ Megasol™ dry about 30% to about 40% faster than industry standard refractory slurries which use much smaller particle size colloidal silica sol binders and which contain higher amounts of water.

Dewaxing

The green ceramic shell molds may be dewaxed by immersion into boiling water, steam autoclaving, and flash dewaxing as is known in the art. Steam autoclaving may be performed by:

1. Using as high a steam pressure as possible, preferably about 60 psi or higher, more preferably about 80–90 psi.
2. Closing and pressurizing the autoclave as rapidly as possible, preferably in less than about 15 to 20 seconds.
3. Exposing the air dried green shell to the steam for about 10 to 15 minutes.
4. Slowing depressurizing the autoclave over about 30 to 60 seconds.

Flash dewaxing may be performed by plunging the air dried green shell mold into a furnace heated to about 1000° F. to about 1900° F. At these temperatures, the wax next to the wall of the ceramic shell rapidly melts so that the pressure due to expansion of the wax does not crack the ceramic shell. The ceramic shell may then be removed to a cooler temperature zone of about 200° F. to 600° F. to complete the removal of the wax. The melted wax can drain through a bottom opening in the melting chamber into a water bath or reservoir for recovery.

Furnacing

Furnacing entails heating the dewaxed ceramic shell mold produced above to about 1600° F. to about 2000° F. to remove volatile residues and to produce a high strength ceramic shell mold by forming stable ceramic bonds through sintering. The dewaxed ceramic shell mold is held in the furnace to attain thermal equilibrium, after which it is retrieved from the furnace and cast with the desired molten metal.

The invention is further described below by reference to the following non-limiting examples.

EXAMPLE 1

An 8 inch by ⅞ inch by ⅜ inch wax bar pattern 1 as shown in FIG. 1 is dipped into a refractory slurry of the composition shown in Table 1. For convenience, the same refractory slurry is used for both prime and back-up coats.

TABLE 1

| MATERIAL | AMOUNT |
|---|---|
| Megasol ™[1] | 1000 gm |
| Tecosil 120 F.[2] | 1500 gm |
| Zircon 325[3] | 400 gm |
| PS 9400 Surfactant[4] | 2 ml |

[1]Megasol ™ colloidal silica sol binder having 50% solids content from Wesbond Corp.
[2]Fused silica from C-E Minerals, particle size of 44–177 microns
[3]Calcined Florida Zircon, particle size of −325 mesh from Continental Minerals
[4] Non-ionic surfactant available from Buntrock Industries, Williamsburg, VA. PS 9400 is a polyoxethylated decyl alcohol that has a specific gravity of about 1.0, and a pH of about 7 to 9.

Wax pattern 1 is dipped into the refractory slurry for 5 seconds, removed, and allowed to drain for 10 seconds to form a first prime coat. Zircon sand of −70 to 140 mesh available from DuPont Corp. is applied as stucco to the first prime coat. The zircon sand stuccoed, prime coated bar pattern is dried for one hour, and then again dipped into the refractory slurry for 5 seconds to form a second prime coat and again stuccoed with the zircon sand of −70 to 140 mesh.

Figure 2:
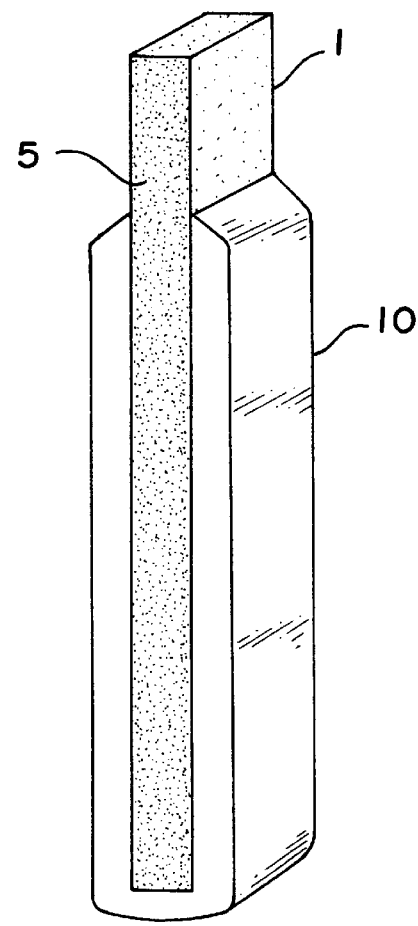
FIG. 2 is an isometric view of a green shell 10 prior to removal of pattern 1.

Wax pattern 1 having two stuccoed prime coats then is dipped into the refractory slurry for five seconds and drained for ten seconds to provide a first back up coat. The first refractory back-up coat then is stuccoed with Tecosil −30 mesh to 50 mesh fused silica available from C-E Minerals. The stuccoed back-up coat then is dried for one hour. This is repeated to provide a total of five back-up coats stuccoed with the Tecosil −30 mesh to 50 mesh fused silica. After application of each prime coat and refractory back-up coat, vertical sides 5 of pattern 1 are scraped to remove the coats and stucco. The resulting green ceramic shell 10 formed on pattern 1 having two prime coat-zircon sand stucco layers and five back-up coat-stucco layers where the stucco is Tecosil −30 to +50 mesh fused silica from C-E Minerals Co., as shown in FIG. 2, again is dipped into the refractory slurry to provide a seal coating. The seal coating is not removed from the sides of pattern 1.

Figure 3:
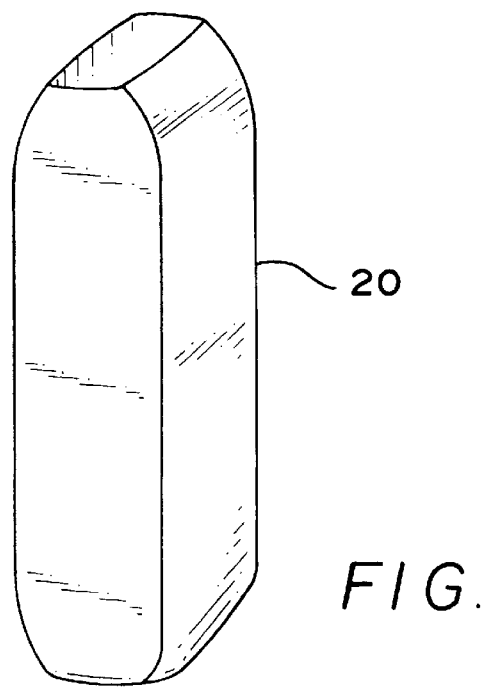
FIG. 3 is an isometric view of a dewaxed, dried green ceramic shell 20.

The seal coated, green ceramic shell is dried at 70–75 ° F. overnight. The dried, green ceramic shell is immersed in boiling water to remove pattern 1. The resulting dewaxed, dried green ceramic shell 20, shown in FIG. 3, is cut in half lengthwise, and dried over night. A section of the green ceramic shell that measures 1 inch wide by 6 inches long by 0.3 inches thick is evaluated for strength by loading a 2 inch span of the section to failure in flexure. The modulus of rupture ("MOR") of the green ceramic shell is calculated using the formula:

$$R=(3WI)/(2bd^2)$$

where:
$R$=modulus of rupture in lbs/in$^2$
$W$=load in pounds at which the specimen failed
$I$=distance (span) in inches between the center-lines of the lower bearing edges
$b$=width of specimen in inches
$d$=depth of specimen in inches The modulus of rupture is shown in Table 2.

A section of the green ceramic shell that measures 1 inch wide by 6 inches long by 0.3 inches thick is fired at 1800 F. for one hour. The fired section then is evaluated for strength by loading a 2 inch span of the section to failure in flexure as described above. The modulus of rupture ("MOR") of the fired ceramic shell is calculated using the formula above. The results are shown in Table 2.

EXAMPLE 2

The procedure of example 1 is followed except that the Megasol™ is diluted with water to provide a colloidal silica solids content of 45%. The MOR is measured as in example 1.

EXAMPLE 3

The procedure of example 1 is followed except that the Megasol™ is diluted with water to provide a colloidal silica solids content of 40%. The MOR is measured as in example 1.

EXAMPLE 4

The procedure of example 1 is followed except that the Megasol™ is diluted with water to provide a colloidal silica solids content of 35%. The MOR is measured as in example 1.

EXAMPLE 5

The procedure of example 1 is followed except that Mulgrain M47-22S having a particle size of −20+50 mesh is substituted for the −30+50 mesh Tecosil fused silica. Mulgrain M47-22S is available from CE Minerals Co. The MOR is measured as in example 1.

EXAMPLE 6

The procedure of example 5 is followed except that the Megasol™ is diluted with water to provide a colloidal silica solids content of 45%. The MOR is measured as in example 1.

EXAMPLE 7

The procedure of example 5 is followed except that the Megasol™ is diluted with water to provide a colloidal silica solids content of 40%. The MOR is measured as in example 1.

COMPARATIVE EXAMPLES 8–12

EXAMPLE 8

The procedure of example 1 is followed except that NYACOL 830 colloidal silica sol having an average particle size of about 8 nanometer and a colloidal silica solids content of 30% is substituted for the Megasol™ colloidal silica sol having 50% solids content. NYACOL 830 is available from EKA Chemicals Co. The MOR is measured as in example 1.

EXAMPLE 9

The procedure of example 8 is followed except that NYACOL 830 is diluted with water to provide a colloidal silica solids content of 24%. The MOR is measured as in example 1.

EXAMPLE 10

The procedure of example 8 is followed except that Mulgrain M47-22S of −20+50 mesh size is substituted for the −30+50 mesh Tecosil fused silica. The MOR is measured as in example 1.

EXAMPLE 11

The procedure of example 10 is followed except that NYACOL 830 is diluted with water to provide a colloidal silica solids content of 27%. The MOR is measured as in example 1.

EXAMPLE 12

The procedure of example 10 is followed except that NYACOL 830 is diluted with water to provide a colloidal silica solids content of 24%. The MOR is measured as in example 1.

To illustrate the reduced drying times achievable with use of Megasol™, the total drying times for the five back-up coats applied in examples 1 and 8 are compared. Drying time is measured using a thermocouple attached to the samples. A Pace Scientific Pocket Logger Model XR340 records time versus temperature. Each coat is considered dry when its temperature is two degrees from ambient. Ambient temperature is 70° F.±5° F., and relative humidity is about 30%±5%. The results are shown in Table 2. As shown in Table 2, back-up coats formed from refractory back-up slurries which use Megasol™ at a solids content of 50% dry in about 67% of the time required to dry the five back-up coats formed from refractory back-up coat slurries which use NYACOL 830.

TABLE 2

| Example | Megasol™ Binder Solids Content % | NYACOL 830 Binder Solids Content % | Back up Stucco | MOR-green | MOR-fired[1] |
|---|---|---|---|---|---|
| 1* | 50 | — | Fused Silica 30–50 mesh | 709 PSI | 1334 PSI |
| 2* | 45 | — | Fused Silica 30–50 mesh | 957 | 1474 |
| 3* | 40 | — | Fused Silica 30–50 mesh | 834 | 1230 |
| 4* | 35 | — | Fused Silica 30–50 mesh | 719 | 1231 |
| 5* | 50 | — | Mulgrain M47-22S 20–50 mesh | 800 | 700 |
| 6* | 45 | — | Mulgrain M47-22S 20–50 mesh | 935 | 958 |
| 7* | 40 | — | Mulgrain M47-22S 20–50 mesh | 923 | 856 |
| 8** | — | 30 | Fused Silica 30–50 mesh | 487 | 754 |
| 9** | — | 24 | Fused Silica 30–50 mesh | 605 | 550 |
| 10** | — | 30 | Mulgrain M47-22S 20–50 mesh | 470 | 616 |
| 11** | — | 27 | Mulgrain M47-22S 20–50 mesh | 640 | 627 |
| 12** | — | 24 | Mulgrain M47-22S 20–50 mesh | 658 | 571 |

[1]Fired Modulus of Rupture is obtained after firing the shell at 1800° F. for 1 hour.
*Total Drying time for 5 Back up coats is 141 minutes
**Total Drying time for 5 Back up coats is 236 minutes

COMPARATIVE EXAMPLES 13–18

These examples illustrate the increased strengths of the ceramic shell molds due to use of refractory slurries which use Megasol™ over ceramic shells made from refractory slurries which use silica sols having an average particle sizes of 14 nanometers and 20 nanometers. The results are shown in Table 3.

EXAMPLE 13

The procedure of example 1 is followed except that Ludox® HS 40 colloidal silica sol having an average particle size of 14 nanometer and a colloidal silica solids content of 35% is substituted for the Megasol™ having 50% solids content. Ludox® HS 40 is available from E.I. DuPont deNemours, Inc. The green and fired MORs are measured as in example 1.

EXAMPLE 14

The procedure of example 13 is followed except that the Ludox® HS 40 colloidal silica sol has a colloidal silica solids content of 40%. The green and fired MORs are measured as in example 1.

EXAMPLE 15

The procedure of example 1 is followed except that Ludox® TM colloidal silica sol having an average particle size of 20 nanometer and a colloidal silica solids content of 35% is substituted for the Megasol™ having 50% solids content. Ludox® HS 40 is available from E.I. DuPont deNemours, Inc. The green and fired MORs are measured as in example 1.

EXAMPLE 16

The procedure of example 14 is followed except that the Ludox® TM colloidal silica sol has a colloidal silica solids content of 40%. The green and fired MORs are measured as in example 1.

EXAMPLE 17

The procedure of example 1 is followed except that the Megasol™ colloidal silica sol has 35% solids content. The green and fired MORs are measured as in example 1.

EXAMPLE 18

The procedure of example 1 is followed except that the Megasol™ colloidal silica sol has 40% solids content. The green and fired MORs are measured as in example 1.

Megasol is present in at least one of the prime coat and back-up coat. Preferably, the blend of potassium silicate and Megasol is present in both the prime coat composition and the back-up coat composition. In each of the prime coat and back-up coat, the potassium silicate may be present in an amount of up to 50% by weight of the Megasol. Preferably, the potassium silicate is present in an amount of about 6–8% by weight of the Megasol, most preferably about 6%.

EXAMPLE 19

The procedure of example 1 is followed except that the refractory slurry used for both prime and back-up coats has the composition shown in Table 4. The Megasol employed in Table 4 has a solids content of 40%.

TABLE 4

| MATERIAL | AMOUNT |
|---|---|
| Megasol ™[1] | 700 gm |
| 400 mesh silica[2] | 1375 gm |
| PS 9400 Surfactant[3] | 2 ml |
| Potassium silicate[4] | 16.8 gm |

[1]Megasol ™ colloidal silica sol binder having 40% solids content from Wesbond Corp.
[2]Fused silica
[3]Surfactant available from Buntrock Industries, Williamsburg, VA
[4]Kasil Potassium silicate from PQ Corporation. Weight ratio of $SiO_2/K_2O$ is 2.5, 8.3% $K_2O$, 20.8% $SiO_2$, and 29.1% solids.

The green and fired MORs are measured as in example 1. The green MOR is 913 psi. The fired MOR is 1424 psi.

EXAMPLE 20

The procedure of example 19 is followed except that the prime and back-up coats has the composition shown in Table 5.

TABLE 5

| MATERIAL | AMOUNT |
|---|---|
| Megasol ™[1] | 700 gm |
| 140 mesh silica[2] | 1375 gm |
| PS 9400 Surfactant[3] | 2 ml |
| Potassium silicate[4] | 22.4 gm |

[1]Megasol ™ colloidal silica sol binder having 40% solids content from Wesbond Corp.
[2]Fused silica
[3]Surfactant available from Buntrock Industries, Williamsburg, VA
[4]Kasil Potassium silicate from PQ Corporation. Weight ratio of $SiO_2/K_2O$ is 2.5, 8.3% $K_2O$, 20.8% $SiO_2$, and 29.1% solids.

The green and fired MORs are measured as in example 1. The green MOR is 912 psi. The fired MOR is 1362 psi.

TABLE 3

| Example | Megasol ™ Binder Solids Content % | Ludox ® HS 40 Binder Solids Content % | Ludox ® TM 40 Binder Solids Content % | MOR-green | MOR-fired |
|---|---|---|---|---|---|
| 13 | — | 35 | — | 350 PSI | 325 PSI |
| 14 | — | 40 | — | 250 | 230 |
| 15 | — | — | 35 | 400 | 780 |
| 16 | — | — | 40 | 325 | 600 |
| 17 | 35 | — | — | 650 | 1015 |
| 18 | 40 | — | — | 820 | 1535 |

In yet another embodiment of the invention, as illustrated by non-limiting examples 19–20, potassium silicate is admixed with Megasol. The blend of potassium silicate and In yet another embodiment of the invention, as illustrated in non-limiting examples 21–24, a commercial small size colloidal silica sol is admixed with Megasol. The blend of colloidal silica sol and Megasol is present in at least one of the prime coat and back-up coat. Preferably, the blend of colloidal silica sol and Megasol is present in both the prime coat composition and the back-up coat composition. In each of the prime coat and back-up coat, the commercial small size colloidal silica sol may be present in the blend in an amount of up to about 18% to about 85 % by weight of the Megasol.

An especially useful commercial small size colloidal silica sol which may be admixed with Megasol as described above is NYACOL 830 having an average particle size of 8 nanometer and 24% silica solids from EKA Chemicals Co. Other useful commercial small size silica sols which may be admixed with Megasol according to this embodiment may have average particle sizes of about 12 nanometer, 14 nanometer, 20 nanometer and 22 nanometer.

EXAMPLE 21

The procedure of example 1 is followed except that the refractory slurry used for both prime and back-up coats has the composition shown in Table 6. The Megasol employed in Table 6 has a solids content of 50%.

TABLE 6

| MATERIAL | AMOUNT |
| --- | --- |
| Megasol ™[1] | 100 gm |
| Tecosil 120 F.[2] | 1190 gm |
| Zircon 325[3] | 330 gm |
| PS 9400 Surfactant[4] | 2 ml |
| NYACOL 830[5] | 562 gm |

[1]Megasol ™ colloidal silica sol binder having 50% solids content from Wesbond Corp.
[2]Fused silica
[3]Calcined Florida Zircon, particle size of −325 mesh from Continental Minerals
[4]Surfactant available from Buntrock Industries, Williamsburg, VA
[5]NYACOL 830 @ 24% silica solids from EKA Chemicals Co.

The green and fired MORs are measured as in example 1. The green MOR is 740 psi. The fired MOR is 1618 psi.

EXAMPLE 22

The procedure of example 21 is followed except that Megasol™ is present in an amount of 172 gms and NYACOL 830 is present in an amount of 490 gms.

The green and fired MORs are measured as in example 1. The green MOR is 870 psi. The fired MOR is 1493 psi.

EXAMPLE 23

The procedure of example 21 is followed except that Megasol™ is present in an amount of 542 gms and NYACOL 830 is present in an amount of 120 gms.

The green and fired MORs are measured as in example 1. The green MOR is 858 psi. The fired MOR is 1668 psi.

In yet another embodiment of the invention, as illustrated in examples 24–26, a colloidal binder that employs potassium silicate, a commercial small size colloidal silica sol and Megasol™ is used in at least one of the prime coat and back-up coats. Preferably, the colloidal binder is present in both the prime coat and the back-up coat. In each of the prime coat and back-up coat, the potassium silicate, small size colloidal silica sol, and Megasol™ may be present in the colloidal binder in varying amounts. Megasol™ may be present in the colloidal binder of this embodiment in an amount of up to about 10% to about 87% by weight of the colloidal binder; potassium silicate may be present in an amount of up to about 3% to about 8% by weight of the colloidal binder; and the small particle size colloidal sol may be present in the colloidal binder an amount of up to about 5% to about 87% by weight of the colloidal binder. In this embodiment, the potassium silicate preferably is Kasil Potassium silicate from PQ Corporation. Kasil Potassium silicate has a weight ratio of $SiO_2/K_2O$ is 2.5, 8.3% $K_2O$, 20.8% $SiO_2$, and 29.1% solids. Also, in this embodiment, the preferred small size particle size colloidal sol is NYACOL 830 having an average particle size of 8 nanometer and 24% silica solids from EKA Chemicals Co.

EXAMPLE 24

The procedure of example 1 is followed except that the refractory slurry used for both prime and back-up coats has the composition shown in Table 7.

TABLE 7

| MATERIAL | AMOUNT |
| --- | --- |
| Colloidal Binder[1] | 1000 gm |
| Tecosil 120 F.[2] | 1500 gm |
| Zircon 325[3] | 400 gm |
| PS 9400 Surfactant[4] | 2 ml |

[1]Blend of Megasol ™ having 50% solids content from Wesbond Corp., Kasil Potassium silicate and NYACOL 830 wherein Megasol ™ is present in an amount of 87% by weight of the colloidal binder, Kasil is present in an amount of about 8% by weight of the colloidal binder, and NYACOL 830 is present in an amount of about 5% by weight of the colloidal binder.
[2]Fused silica from C-E Minerals, particle size of 44–177 microns
[3]Calcined Florida Zircon, particle size of −325 mesh from Continental Minerals
[4]Surfactant available from Buntrock Industries, Williamsburg, VA

EXAMPLE 25

The procedure of example 24 is followed except that in the colloidal binder the Megasol™ is present in an amount of 10% by weight of the colloidal binder, Kasil is present in an amount of about 3% by weight of the colloidal binder, and NYACOL 830 is present in an amount of about 87% by weight of the colloidal binder.

EXAMPLE 26

The procedure of example 24 is followed except that in the colloidal binder the Megasol™ is present in an amount of 57% by weight of the colloidal binder, Kasil is present in an amount of about 5% by weight of the colloidal binder, and NYACOL 830 is present in an amount of about 38% by weight of the colloidal binder.

I claim:
1. A method of manufacture of a ceramic shell mold comprising,
   applying a coating of a prime coat slurry comprising refractory material and a colloidal silica sol onto an expendable pattern of thermoplastic material to produce a prime coated preform,
   drying said prime coated preform,
   applying at least one coating of a refractory back-up coat slurry comprising refractory material and a colloidal silica sol onto said prime coated preform to produce a refractory back-up coated preform,
   drying said refractory back-up coated preform,
   removing said thermoplastic pattern from said refractory back-up coated preform to produce a green shell mold, and
   heating said green shell mold to a temperature sufficient to produce a ceramic shell mold, wherein in at least one of said prime coat slurry or refractory back-up slurry said sol is an aqueous colloidal silica sol having an average particle size of about 40 nanometer.

2. The method of claim 1 further comprising applying stucco material to at least one of said prime coated preform or refractory back-up coated preform prior to drying of said prime coated preform or refractory back-up coated preform.

3. The method of claim 2 wherein said colloidal silica sol has a particle size range of about 6 nm to about 190 nm.

4. The method of claim 3 wherein said colloidal silica sol has a standard deviation of particles of about 20 nm.

5. The method of claim 3 wherein said sol has a sodium content of about 0.02% to about 0.35%.

6. The method of claim 2 wherein said silica sol has a solids content of about 30% to about 50%.

7. The method of claim 6 wherein said silica sol has a solids content of about 40%.

8. The method of claim 2 wherein said prime coat slurry comprises a refractory grain selected from the group consisting of fused silica and zircon, said refractory grain having a particle size of about −200 mesh to about −350 mesh.

9. The method of claim 8 wherein said refractory back-up coat slurry comprises fused silica having a particle size of about −80 mesh to about −270 mesh.

10. The product of the process of claim 2.

11. The method of claim 1 wherein five refractory back-up coats are applied and drying of said back-up coats is 141 minutes.

12. A method of manufacture of a ceramic shell mold comprising, applying a coating of a prime coat slurry comprising refractory material and a colloidal binder comprising silica sol and potassium silicate onto an expendable pattern of thermoplastic material to produce a prime coated preform, drying said prime coated preform, applying at least one coating of a refractory back-up coat slurry comprising refractory material and a colloidal silica sol onto said prime coated preform to produce a refractory back-up coated preform, drying said refractory back-up coated preform, removing said thermoplastic pattern from said refractory back-up coated preform to produce a green shell mold, and heating said green shell mold to a temperature sufficient to produce a ceramic shell mold, wherein in at least one of said prime coat slurry or refractory back-up slurry said colloidal said silica sol employed in said colloidal silica binder is an aqueous colloidal silica sol having an average particle size of about 40 nanometer.

13. The method of claim 12 further comprising applying stucco material to at least one of said prime coated preform or refractory back-up coated preform prior to drying of said prime coated preform or refractory back-up coated preform.

14. The method of claim 13 wherein the potassium silicate is present in an amount of up to 50% by weight of the colloidal silica sol that has an average particle size of about 40 nanometer.

15. The method of claim 14 wherein the potassium silicate is present in an amount of about 6–8% by weight of the colloidal silica sol that has an average particle size of about 40 nanometer.

16. The method of claim 15 wherein the potassium silicate is present in an amount of about 6% by weight of the colloidal silica binder that has an average particle size of about 40 nanometer.

17. The product of the process of claim 13.

* * * * *